(12) United States Patent
Lewis et al.

(10) Patent No.: US 7,756,652 B2
(45) Date of Patent: Jul. 13, 2010

(54) ESTIMATING A POWER UTILIZATION OF A COMPUTER SYSTEM

(75) Inventors: Andrew J. Lewis, Litchfield, NH (US); Kalyanaraman Vaidyanathan, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1 day.

(21) Appl. No.: 12/109,112

(22) Filed: Apr. 24, 2008

(65) Prior Publication Data

US 2009/0271046 A1    Oct. 29, 2009

(51) Int. Cl.
*G01R 21/00* (2006.01)
(52) U.S. Cl. .................. 702/60; 702/57; 702/182
(58) Field of Classification Search .......... 702/57, 702/60, 61
See application file for complete search history.

(56) References Cited

U.S. PATENT DOCUMENTS

2002/0004912 A1*  1/2002  Fung ................... 713/300
2003/0076183 A1*  4/2003  Tam et al. ............ 331/100
2004/0078723 A1*  4/2004  Gross et al. .......... 714/47
2007/0040582 A1*  2/2007  Gross et al. .......... 326/88

OTHER PUBLICATIONS

Freescale Semiconductor, MPC7457 RISC Microprocessor Hardware Specifications, Mar. 2006, Freescale Semiconductor, Rev. 7, pp. 1-72.*

* cited by examiner

*Primary Examiner*—Carol S Tsai
*Assistant Examiner*—Mi'schita' Henson
(74) *Attorney, Agent, or Firm*—Park, Vaughan & Fleming LLP

(57) ABSTRACT

One embodiment of the present invention provides a system that estimates a power utilization of a computer system. During operation, a set of performance parameters of the computer system is monitored, wherein the computer system includes a processor. Then the power utilization of the computer system is estimated based on the set of performance parameters and a power-utilization model, wherein the power-utilization model was trained by measuring a power utilization of the computer system while the processor is operating at a first frequency and measuring a power utilization of the computer system while the processor is operating at a second frequency.

24 Claims, 4 Drawing Sheets

ESTIMATING A POWER UTILIZATION OF A COMPUTER SYSTEM

RELATED APPLICATIONS

This application is related to a pending U.S. patent application entitled, "Synchronizing Signals Related to the Operation of a Computer System," by inventors Kalyanaraman Vaidyanathan and Kenny C. Gross having Ser. No. 12/101,321, and filed on 11 Apr. 2008. The above-listed application is hereby incorporated by reference.

BACKGROUND

1. Field

The present invention generally relates to techniques for monitoring computer systems. More specifically, the present invention relates to a method and an apparatus that estimates a power utilization of a computer system.

2. Related Art

The power needs of computer data centers are typically estimated by adding up the maximum power usage rating for each computer system to be installed in the center. This may substantially overestimate the power requirements for the data center, resulting in increased costs in setting up the center. Data center operators desire a more accurate estimate of the actual power used by computer systems during operation of their data centers in order to better match the power provisioning of their center to the actual needs. Power monitoring is also useful in a hosting/co-location datacenter, where a customer of the hosting company is billed on the power used by the server rather than a flat rate per month, or in a multi-business datacenter where each business unit is billed for the exact amount of power they use.

In order to directly measure the power used by a computer system, hardware power meters could be installed, but this may not only be costly but also could require computers to be powered down for installation. Other techniques for determining the power utilized by a computer system involve measuring parameters of the computer during operation and inferring the power utilization, or using a power utilization lookup table based on the operating parameters of the computer system. However, many current computer systems have a dynamic power-management feature that can vary the power consumption of the computer system by changing, for example, the operating frequency and voltage of the processor, allowing the computer system to operate in a large number of operating modes with varying power consumption levels. Some computers also have chipsets that power-down unused PCI and USB controllers. With FBDIMMs there is the capability to throttle the memory, which reduces heat and power usage. Therefore, inferring the power utilization of a computer system based on generating a model from each allowable state or generating a power lookup table that includes all operating states of the computer system is an undesirable solution for computer systems that can implement dynamic power management.

Hence, what is needed is a method and system that estimates a power utilization of a computer system without the above-described problems.

SUMMARY

Some embodiments of the present invention provide a system that estimates a power utilization of a computer system. First, a set of performance parameters of the computer system is monitored, wherein the computer system includes a processor. Then, the power utilization of the computer system is estimated based on the set of performance parameters and a power-utilization model, wherein training the power-utilization model includes measuring a power utilization of the computer system while the processor is operating at a first frequency and measuring a power utilization of the computer system while the processor is operating at a second frequency In some embodiments, monitoring the set of performance parameters of the computer system includes systematically monitoring and recording a set of performance parameters of the computer system, wherein the recording process keeps track of the temporal relationships between events in different performance parameters.

In some embodiments, the first frequency is a minimum frequency of operation of the processor, and the second frequency is a maximum frequency of operation of the processor.

In some embodiments, estimating the power utilization of the computer system based on the set of performance parameters and the power-utilization model includes using a pattern-recognition technique.

In some embodiments, estimating the power utilization of the computer system based on the set of performance parameters and the power-utilization model includes using a nonlinear, nonparametric regression technique.

In some embodiments, estimating the power utilization of the computer system based on the set of performance parameters and the power-utilization model includes using a multivariate state estimation technique.

In some embodiments, estimating the power utilization of the computer system based on the set of performance parameters and the power-utilization model includes processing the set of performance parameters using an analytical re-sampling technique.

In some embodiments, the computer system includes a dynamic power-management feature.

In some embodiments, the dynamic power-management feature includes a feature controlling an operating voltage of the processor.

In some embodiments, the dynamic power-management feature includes a feature controlling an operating frequency of the processor.

In some embodiments, training the power-utilization model includes measuring the power utilization of the computer system while varying a first frequency load on the processor while the processor is operating at the first frequency, and measuring a power utilization of the computer system while varying a second frequency load while the processor is operating at the second frequency.

In some embodiments, training the power-utilization model includes using a pattern-recognition technique.

In some embodiments, training the power-utilization model includes using a nonlinear, nonparametric regression technique.

In some embodiments, training the power-utilization model includes using a multivariate state estimation technique.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
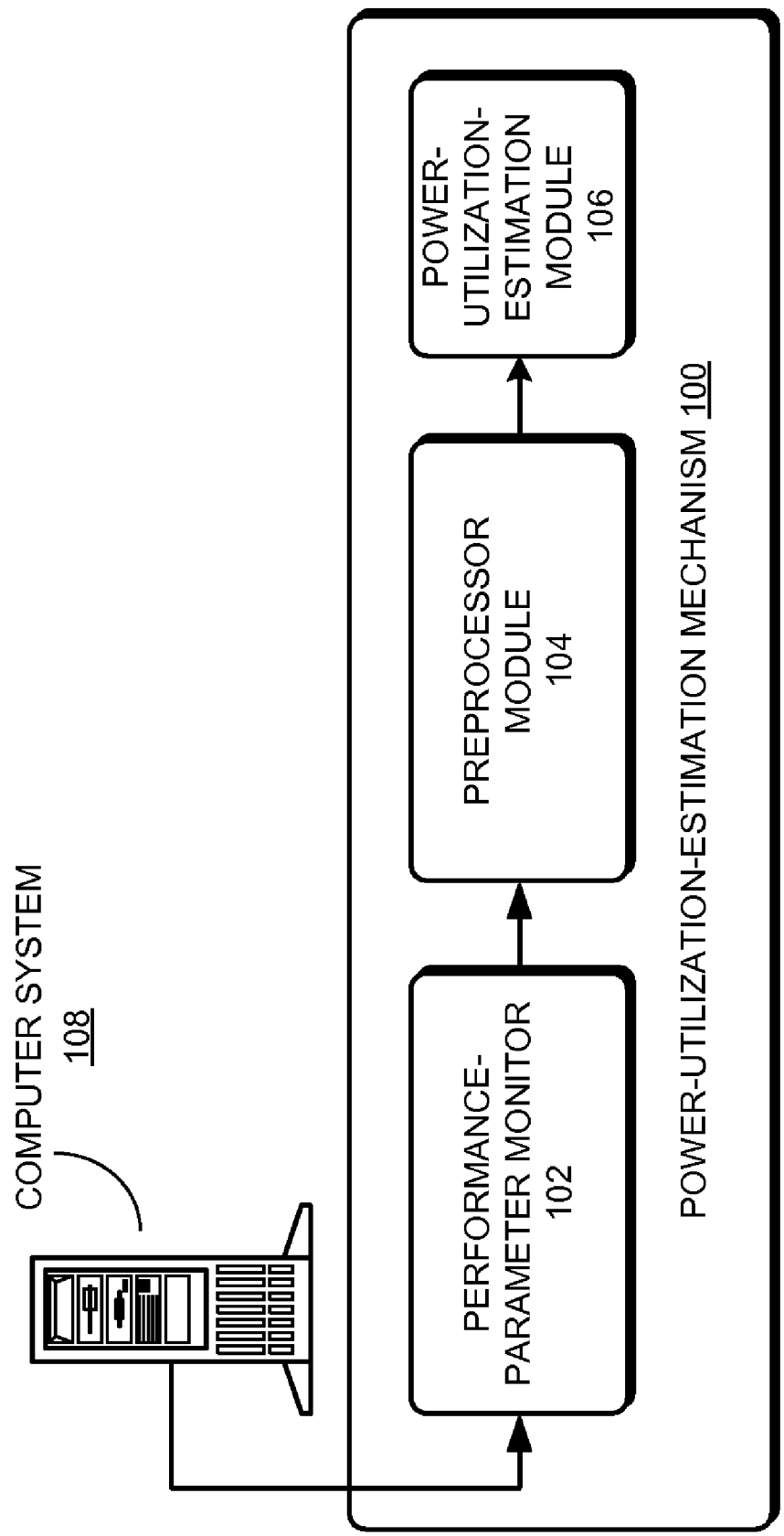
FIG. 1 represents a system that estimates a power utilization of a computer system in accordance with some embodiments of the present invention.

FIG. 1 represents a system that estimates a power utilization of a computer system in accordance with some embodiments of the present invention. Power-utilization-estimation mechanism 100 includes performance-parameter monitor 102, preprocessor module 104, and power-utilization-estimation module 106. Power-utilization-estimation mechanism 100 is coupled to computer system 108. Computer system 108 can include but is not limited to a server, server blade, a datacenter server, a field-replaceable unit, an enterprise computer, or any other computation system that includes one or more processors and one or more cores in each processor. Additionally, computer system 108 can include dynamic power management.

Performance-parameter monitor 102 can be any device that can monitor performance parameters of computer system 108, including but not limited to: temperatures, currents, voltages and fan speeds, performance metrics, loads, throughput variables, transaction latencies, and time series of any performance parameter. Performance parameters can also include but are not limited to performance parameters as set forth in U.S. Pat. No. 7,020,802 which is hereby fully incorporated by reference. Performance-parameter monitor 102 can be implemented in any combination of hardware and software. In some embodiments, performance-parameter monitor 102 operates on computer system 108. In other embodiments, performance-parameter monitor 102 operates on one or more service processors. In still other embodiments, performance-parameter monitor 102 is located inside of computer system 108. In yet other embodiments, performance-parameter monitor 102 operates on a separate computer system. In some embodiments, performance-parameter monitor 102 includes a method or apparatus for monitoring and recording computer system performance parameters as set forth in U.S. Pat. No. 7,020,802.

Preprocessor module 104 can be any device that can preprocess input received from performance-parameter monitor 102 and processes the received input into a form for input into power-utilization-estimation module 106. In some embodiments, preprocessor module 104 is omitted, or operates on performance-parameter monitor 102 or power-utilization-estimation module 106. Preprocessor module 104 can be implemented in any combination of hardware and software. In some embodiments, preprocessor module 104 operates on computer system 108. In other embodiments, preprocessor module 104 operates on one or more service processors. In still other embodiments, preprocessor module 104 is located inside of computer system 108. In yet other embodiments, preprocessor module 104 operates on a separate computer system. In some embodiments, preprocessor module 104 implements techniques referred to and described in U.S. patent application entitled "Synchronizing Signals Related to the Operation of a Computer System," by Kalyanaraman Vaidyanathan and Kenny C. Gross, Ser. No. 12/101,321 filed on 11 Apr. 2008 which is hereby fully incorporated by reference.

Power-utilization-estimation module 106 receives input from preprocessor module 104 and generates an estimate of the power utilization of computer system 108. Power-utilization-estimation module 106 can be implemented in any combination of hardware and software. In some embodiments, power-utilization-estimation module 106 operates on computer system 108. In other embodiments, power-utilization-estimation module 106 operates on one or more service processors. In still other embodiments, power-utilization-estimation module 106 is located inside of computer system 108. In yet other embodiments, power-utilization-estimation module 106 operates on a separate computer system.

In some embodiments, power-utilization-estimation module 106 includes a power-utilization model that uses an inferential model of the power utilization of computer system 108 which is generated during a training phase. The power-utilization model produces an estimate of power consumption in computer system 108 based on information contained in performance parameters monitored by performance-parameter monitor 102. The training phase is discussed in more detail below with respect to FIGS. 3 and 4.

Figure 2:
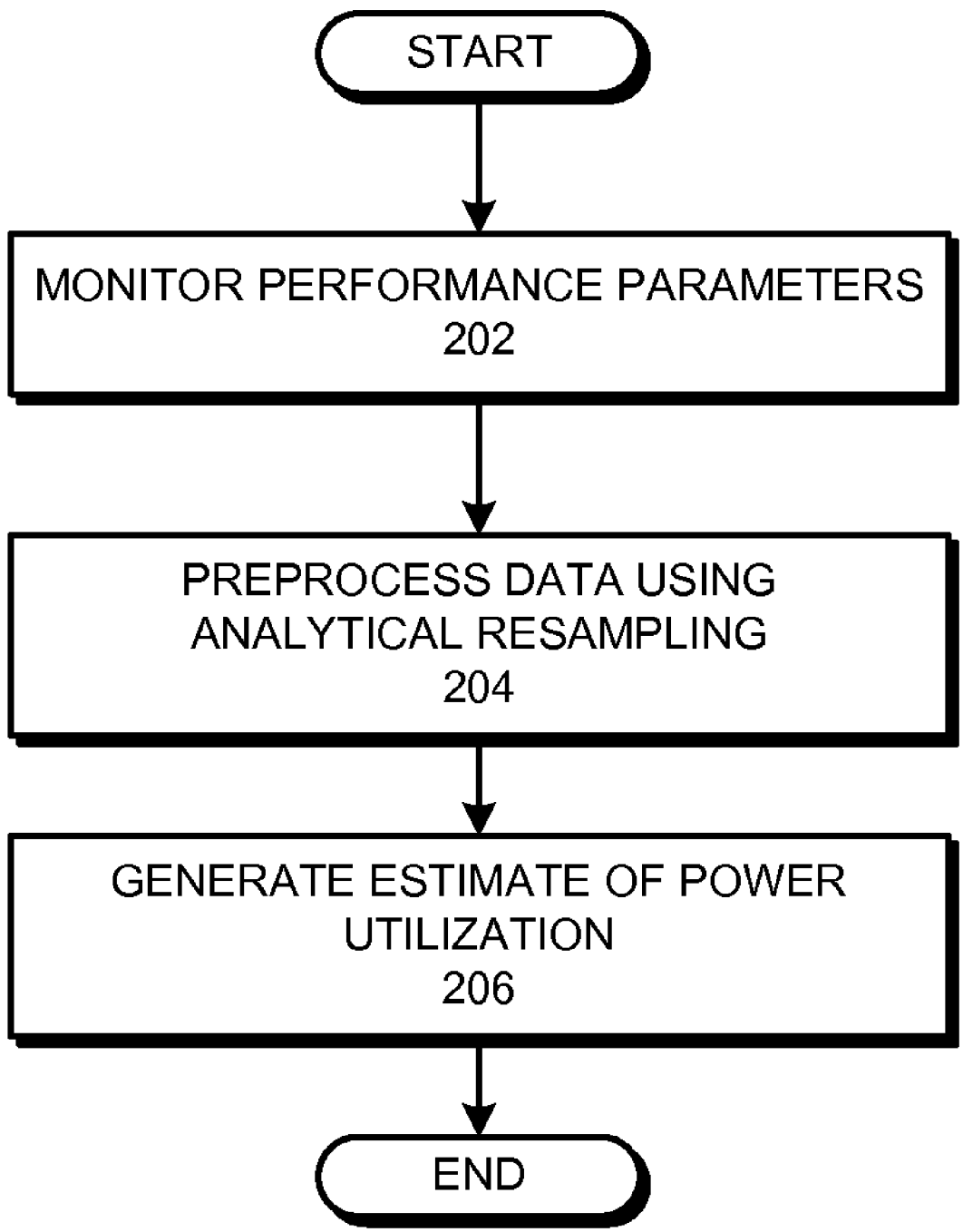
FIG. 2 presents a flow chart illustrating a process that estimates a power utilization of a computer system in accordance with some embodiments of the present invention.

FIG. 2 presents a flow chart illustrating a process that estimates a power utilization of a computer system in accordance with some embodiments of the present invention. First, performance parameters are monitored (step 202) from the computer system. The performance parameter data is then preprocessed using analytical re-sampling (step 204). In some embodiments, the data is preprocessed using techniques referred to and described in U.S. patent application entitled "Synchronizing Signals Related to the Operation of a Computer System," by Kalyanaraman Vaidyanathan and Kenny C. Gross, Ser. No. 12/101,321 filed on 11 Apr. 2008. In some embodiments, step 204 is omitted.

Next an estimate of the power utilization of the computer system is generated (step 206). The estimate is generated using a power-utilization model trained during a training phase as described in FIGS. 3 and 4 below. In some embodiments, the power-utilization model uses a statistical pattern recognition technique. In some embodiments, a nonlinear, nonparametric (NLNP) regression technique, such as the multivariate state estimation technique (MSET) is used. In other embodiments, other pattern recognition techniques, such as neural networks or other types of NLNP regression are used. Yet other embodiments of the present invention use linear regression techniques.

In some embodiments, as discussed in more detail with reference to FIGS. 3 and 4 below, the estimate of power utilization is generated by the power-utilization model using pattern recognition wherein the model is trained based on the behavior of the monitored performance parameters as related to the actual power consumption of the computer system when the computer system is operated at a first frequency and a second frequency.

In some embodiments, while the power utilization of the computer system is being estimated, the computer system is operating in a dynamic power management mode which may include but is not limited to one or more of the following: varying an operating frequency of a processor in the computer system, varying a voltage to a processor in the computer system, limiting the power consumption of a processor in the computer system.

Figure 3:
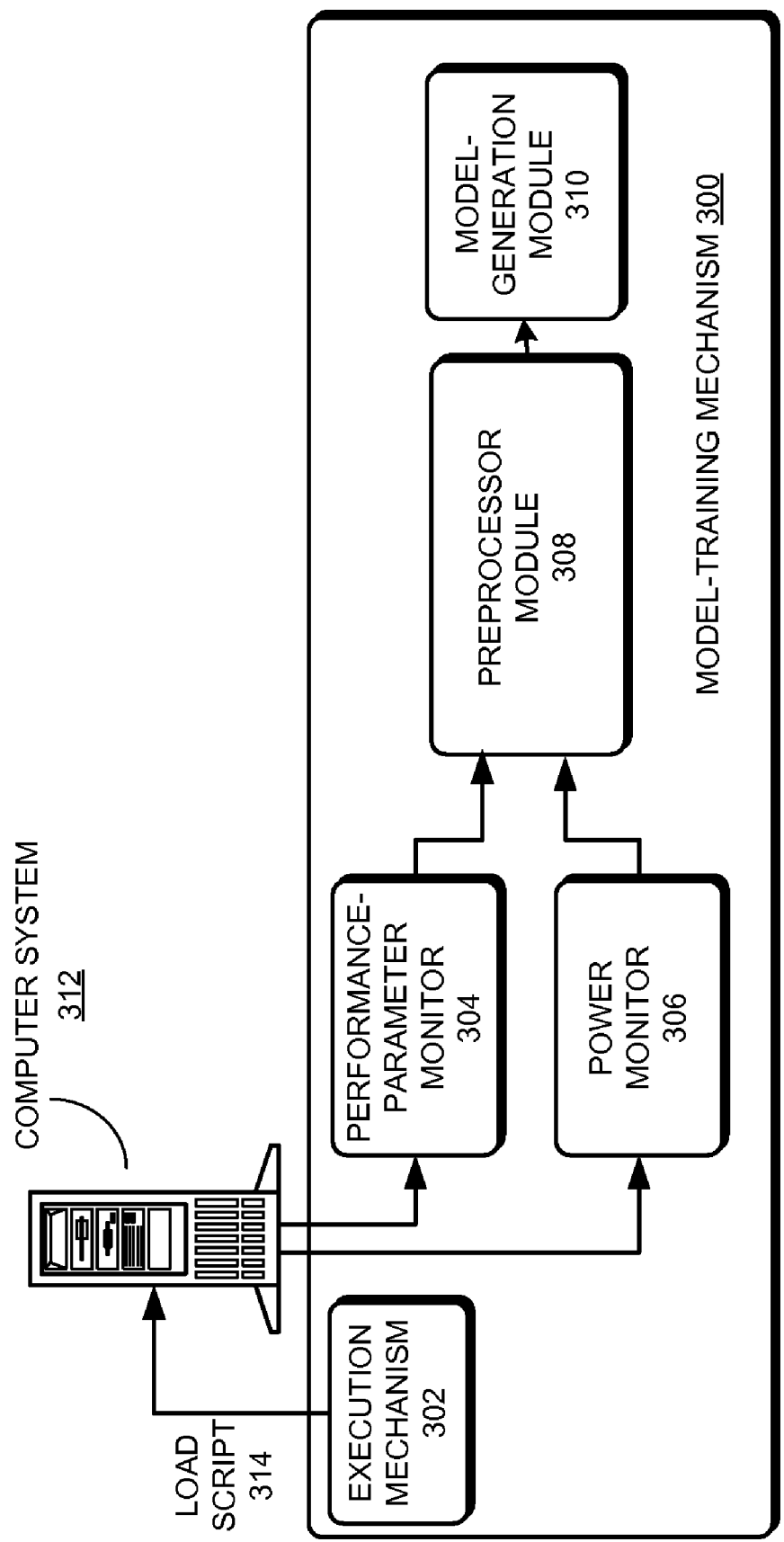
FIG. 3 represents a system that trains a model for estimating a power utilization of a computer system in accordance with some embodiments of the present invention.

FIG. 3 represents a system that trains a model for estimating a power utilization of a computer system in accordance with some embodiments of the present invention. Model-training mechanism 300 includes execution mechanism 302, performance-parameter monitor 304, power monitor 306, preprocessor module 308 and model-generation module 310.

Computer system 312 can include but is not limited to a server, server blade, a datacenter server, a field-replaceable unit, an enterprise computer, or any other computation system that includes one or more processors and one or more cores in each processor. Additionally, computer system 312 can include dynamic power management. In some embodiments, computer system 312 is similar to computer system 108. In some embodiments, computer system 312 is the same or similar model as computer system 108. In some embodiments, computer system 312 is the same computer system as computer system 108.

In some embodiments, execution mechanism 302 causes load script 314 to be executed by computer system 312 during a model-training process. Note that the model-training process can be performed in parallel with normal computer system operation. In some embodiments of the present invention, load script 314 is stored on computer system 312. In some embodiments of the present invention, load script 314 can include: a sequence of instructions that produces a load profile that ranges from no load to a maximum load for a first frequency and a second frequency for a CPU in computer system 312. In some embodiments, the first frequency is the minimum operation frequency for the CPU, and the second frequency is the maximum operation frequency for the CPU.

In some embodiments, as load script 314 is executed on computer system 312, performance-parameter monitor 304 monitors performance parameters of computer system 312 and power monitor 306 monitors the power utilization of computer system 312. Preprocessor module 308 processes the data from performance-parameter monitor 304 and power monitor 306 to put it in a form for use by model-generation module 310. In some embodiments, preprocessor module 308 re-samples the received data so that the data sent to model-generation module 310 has a uniform sampling rate. In some embodiments, preprocessor module 308 synchronizes the received data so that the data sent to model-generation module 310 is in-phase. In some embodiments, preprocessor module 308 preprocesses the received data using techniques referred to and described in U.S. patent application entitled "Synchronizing Signals Related to the Operation of a Computer System," by Kalyanaraman Vaidyanathan and Kenny C. Gross, Ser. No. 12/101,321 filed on Apr. 11, 2008. In some embodiments, preprocessor module is omitted or is included in performance-parameter monitor 304, power monitor 306, and/or model-generation module 310.

Model-generation mechanism 310 receives the data from preprocessor module 308 and generates a power-utilization model. In some embodiments, model-generation mechanism 310 uses data from power monitor 306 and performance-parameter monitor 304 to generate a power-utilization model using a statistical pattern recognition technique. In some embodiments, a nonlinear, nonparametric (NLNP) regression technique, such as the multivariate state estimation technique (MSET), is used. In other embodiments, other pattern recognition techniques, such as neural networks or other types of NLNP regression are used. Yet other embodiments of the present invention use linear regression techniques. The power-utilization model is then used to estimate the power consumption of the computer system when the processor in the computer system is operating at any frequency in the range from the first frequency to the second frequency used during the model-training process, with or without dynamic power-management features operating.

Figure 4:
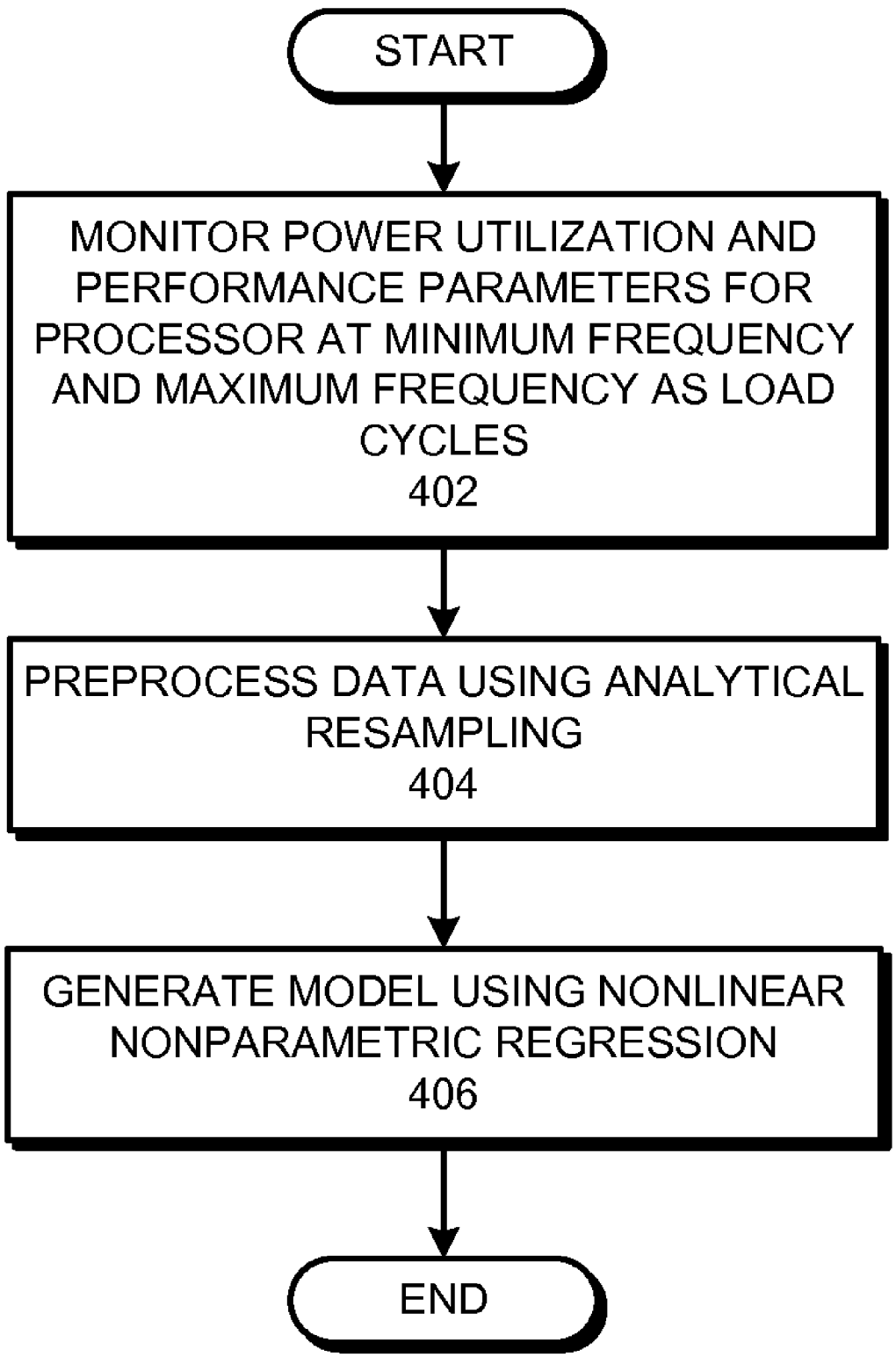
FIG. 4 presents a flow chart illustrating a process that trains a model for estimating a power utilization of a computer system in accordance with some embodiments of the present invention.

FIG. 4 presents a flow chart illustrating a process that trains a model for estimating a power utilization of a computer system in accordance with some embodiments of the present invention. First, power utilization and performance parameters for a computer system are monitored when a processor in the computer system is at a minimum operation frequency as the load on the processor is varied from a minimum load to a maximum load, and when the processor in the computer system is at a maximum operation frequency as the load on the processor is varied from a minimum load to a maximum load (step 402). The data is then preprocessed using analytical re-sampling (step 404). In some embodiments, techniques referred to and described in U.S. patent application entitled "Synchronizing Signals Related to the Operation of a Computer System," by Kalyanaraman Vaidyanathan and Kenny C. Gross, Ser. No. 12/101,321, filed on 11 Apr. 2008 are used. In other embodiments, this step is omitted. Then a power-utilization model is generated using nonlinear, nonparametric regression (step 406).

It is noted that in some embodiments, power-utilization-estimation mechanism 100 and model-training mechanism 300 operate on the same hardware and/or software, or include the same hardware and/or software. In some embodiments, performance-parameter monitor 102 and performance-parameter monitor 304 are the same mechanism, operate on the same hardware and/or software, or include the same hardware and/or software. In some embodiments, preprocessor module 104 and preprocessor module 308 are the same mechanism, operate on the same hardware and/or software, or include the same hardware and/or software.

Also note that the present invention is not meant to be limited to any particular type or implementation of a computer system. In general, the present invention can be applied to any type of computer system including but not limited to, a computer system based on a microprocessor, a mainframe computer, a computer server, a digital signal processor, a portable computing device, a personal organizer, a device controller, and a computational engine within an appliance.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for estimating a power utilization of a computer system, comprising:

monitoring a set of performance parameters of the computer system, wherein the computer system includes a processor;

using a model training mechanism to generate a power-utilization model;

training the power-utilization model by:
 while a processor in a computer system is operating at a first frequency, measuring a power utilization of the computer system while cycling a load on the processor from a first minimum load to a first maximum load;
 while the processor is operating at a second frequency, measuring a power utilization of the computer system while cycling a load on the processor from a second minimum load to a second maximum load; and
 generating the power-utilization model using at least one of a nonlinear, nonparametric regression technique or a pattern-recognition technique; and estimating the power utilization of the computer system based on the set of performance parameters and the power-utilization model.

2. The method of claim 1,
 wherein monitoring the set of performance parameters of the computer system includes systematically monitoring and recording a set of performance parameters of the computer system; and
 wherein the recording process keeps track of the temporal relationships between events in different performance parameters.

3. The method of claim 1, wherein the first frequency is a minimum frequency of operation of the processor and the second frequency is a maximum frequency of operation of the processor.

4. The method of claim 1, wherein estimating the power utilization of the computer system based on the set of performance parameters and the power-utilization model includes using a pattern-recognition technique.

5. The method of claim 1, wherein estimating the power utilization of the computer system based on the set of performance parameters and the power-utilization model includes using a nonlinear, nonparametric regression technique.

6. The method of claim 5, wherein estimating the power utilization of the computer system based on the set of performance parameters and the power-utilization model includes using a multivariate state estimation technique.

7. The method of claim 1, wherein estimating the power utilization of the computer system based on the set of performance parameters and the power-utilization model includes processing the set of performance parameters using an analytical re-sampling technique.

8. The method of claim 1, wherein the computer system includes a dynamic power-management feature.

9. The method of claim 8, wherein the dynamic power-management feature includes a feature controlling an operating voltage of the processor.

10. The method of claim 8, wherein the dynamic power-management feature includes a feature controlling an operating frequency of the processor.

11. The method of claim 1, wherein training the power-utilization model includes using a multivariate state estimation technique.

12. A non-transitory computer-readable storage medium storing instructions that when executed by a computer cause the computer to perform a method for estimating a power utilization of a computer system, the method comprising:
 monitoring a set of performance parameters of the computer system, wherein the computer system includes a processor;
 training the power-utilization model by:
  while a processor in a computer system is operating at a first frequency, measuring a power utilization of the computer system while cycling a load on the processor from a first minimum load to a first maximum load; and
  while the processor is operating at a second frequency, measuring a power utilization of the computer system while cycling a load on the processor from a second minimum load to a second maximum load; and
  generating the power-utilization model using at least one of a nonlinear, nonparametric regression technique or a pattern-recognition technique; and
 estimating the power utilization of the computer system based on the set of performance parameters and the power-utilization model.

13. The computer-readable storage medium of claim 12,
 wherein monitoring the set of performance parameters of the computer system includes systematically monitoring and recording a set of performance parameters of the computer system; and
 wherein the recording process keeps track of the temporal relationships between events in different performance parameters.

14. The computer-readable storage medium of claim 12, wherein the first frequency is a minimum frequency of operation of the processor and the second frequency is a maximum frequency of operation of the processor.

15. The computer-readable storage medium of claim 12, wherein estimating the power utilization of the computer system based on the set of performance parameters and the power-utilization model includes using a pattern-recognition technique.

16. The computer-readable storage medium of claim 12, wherein estimating the power utilization of the computer system based on the set of performance parameters and the power-utilization model includes using a nonlinear, nonparametric regression technique.

17. The computer-readable storage medium of claim 16, wherein estimating the power utilization of the computer system based on the set of performance parameters and the power-utilization model includes using a multivariate state estimation technique.

18. The computer-readable storage medium of claim 12, wherein estimating the power utilization of the computer system based on the set of performance parameters and the power-utilization model includes processing the set of performance parameters using an analytical re-sampling technique.

19. The computer-readable storage medium of claim 12, wherein the computer system includes a dynamic power-management feature.

20. The computer-readable storage medium of claim 19, wherein the dynamic power-management feature includes a feature controlling an operating voltage of the processor.

21. The computer-readable storage medium of claim 19, wherein the dynamic power-management feature includes a feature controlling an operating frequency of the processor.

22. The computer-readable storage medium of claim 12, wherein training the power-utilization model includes using a multivariate state estimation technique.

23. An apparatus for estimating a power utilization of a computer system, comprising:

a monitoring mechanism configured to monitor a set of performance parameters of the computer system, wherein the computer system includes a processor;

a model-training mechanism configured to train a power-utilization model by:

while a processor in a computer system is operating at a first frequency, measuring a power utilization of the computer system while cycling a load on the processor from a first minimum load to a first maximum load;

while the processor is operating at a second frequency, measuring a power utilization of the computer system while cycling a load on the processor from a second minimum load to a second maximum load; and generating the power-utilization model using at least one of a nonlinear, nonparametric regression technique or a pattern-recognition technique; and an estimating mechanism configured to estimate the power utilization of the computer system based on the set of performance parameters and the power-utilization model.

24. The apparatus of claim 23, wherein the computer system includes a dynamic power-management feature.

\* \* \* \* \*